May 22, 1928.
H. KNEIDL
1,670,413
MILLING MACHINE HAVING CRANK DRIVE AND AUTOMATIC FEED
Filed July 25, 1925  4 Sheets-Sheet 1
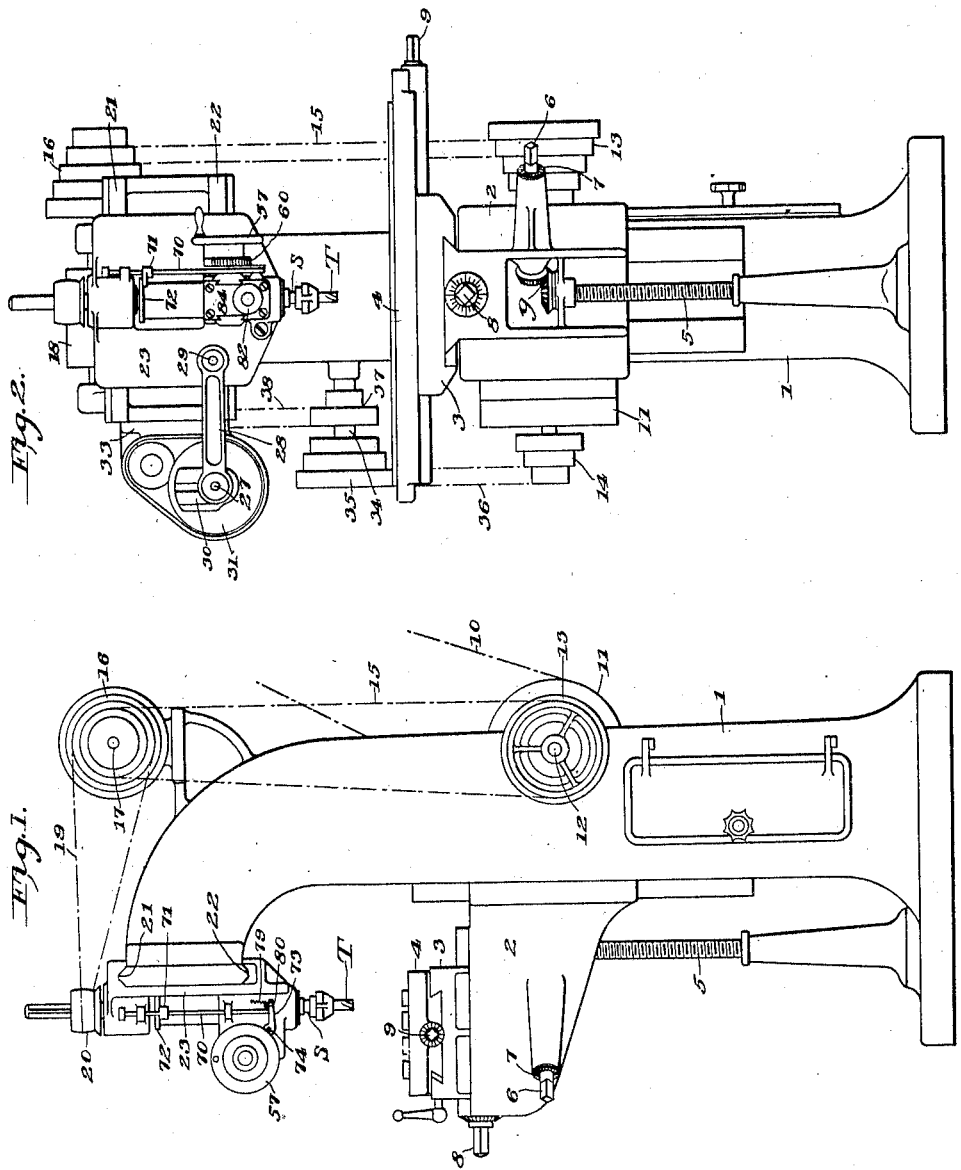
Inventor
Hans Kneidl
By Attorney
Albert F. Nathan May 22, 1928.                                              1,670,413
                          H. KNEIDL
       MILLING MACHINE HAVING CRANK DRIVE AND AUTOMATIC FEED
                    Filed July 25, 1925        4 Sheets-Sheet 2
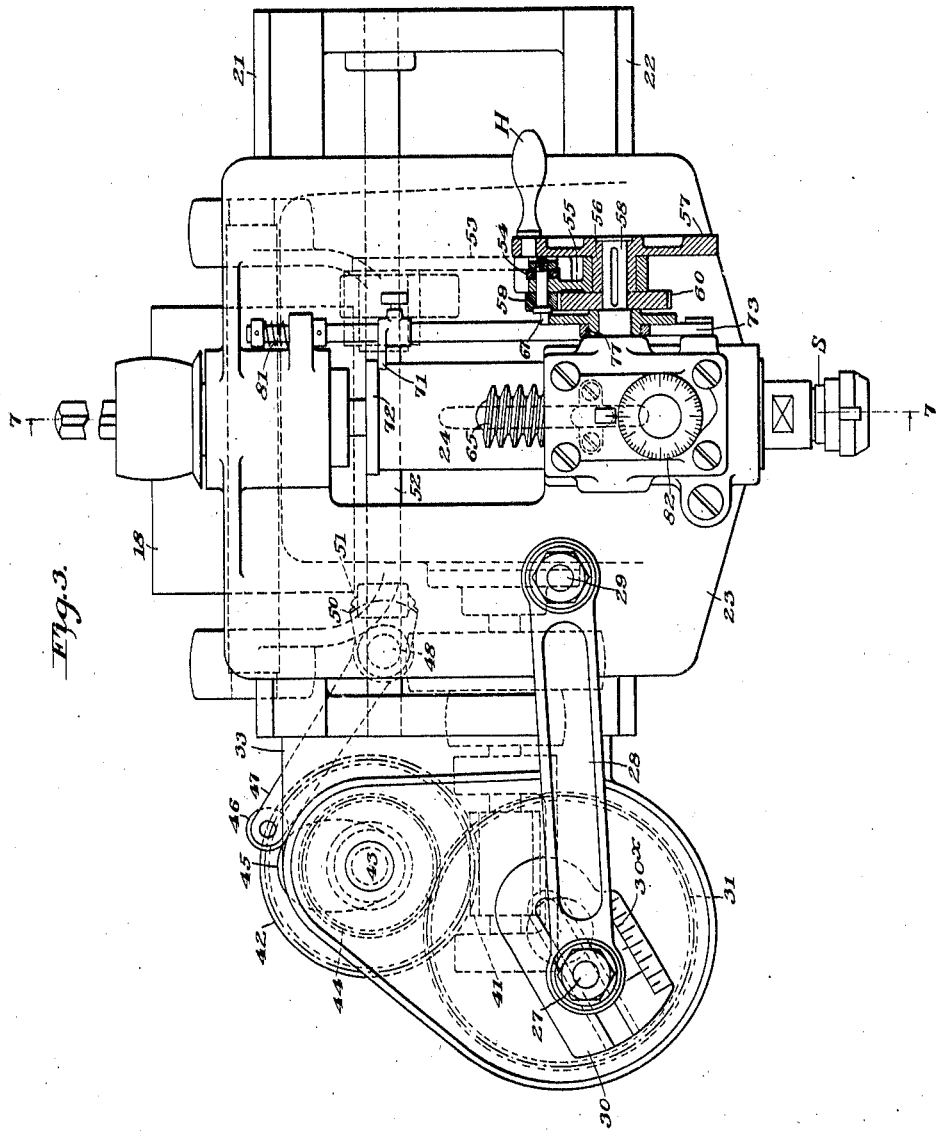
Inventor
Hans Kneidl
By   Attorney
Albert F. Nathan May 22, 1928.
H. KNEIDL
1,670,413
MILLING MACHINE HAVING CRANK DRIVE AND AUTOMATIC FEED
Filed July 25, 1925 4 Sheets-Sheet 3
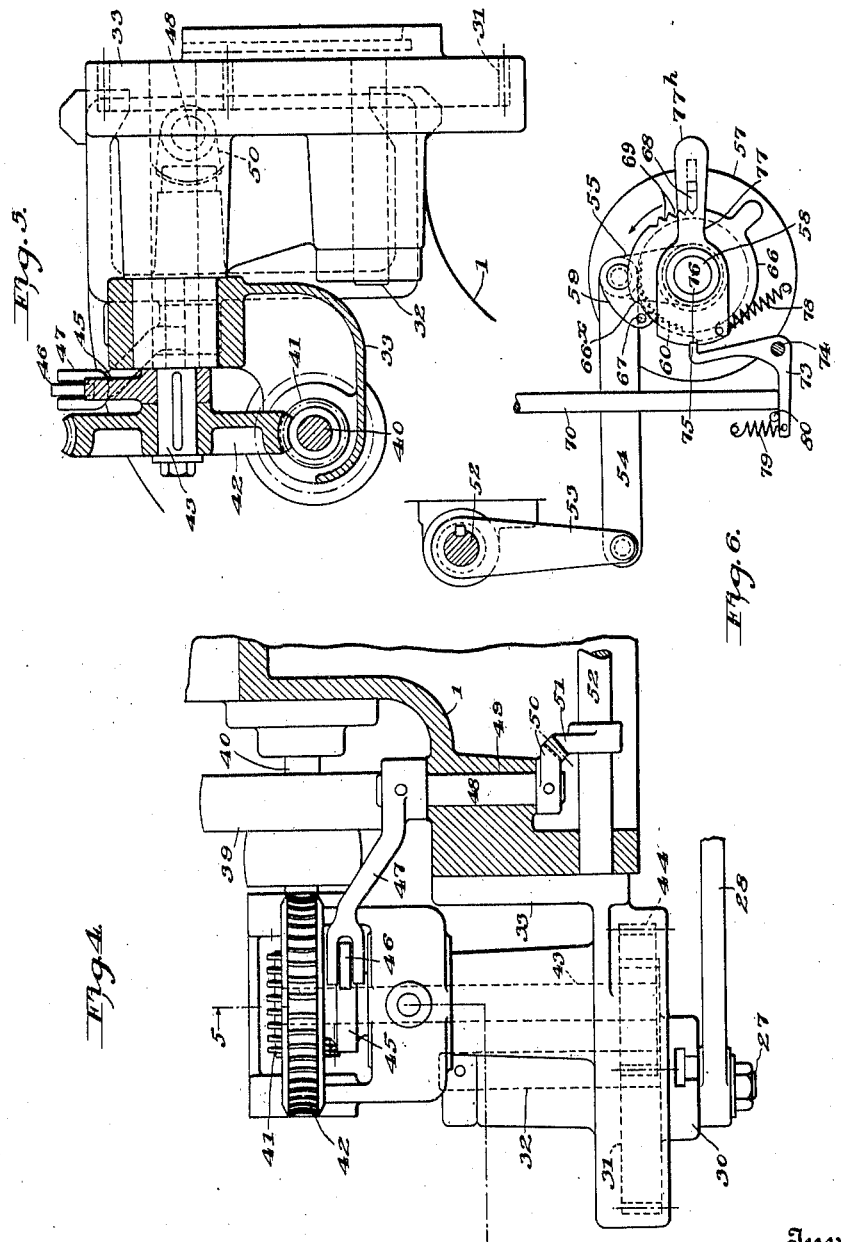
Inventor
Hans Kneidl
By Attorney
Albert F. Nathan

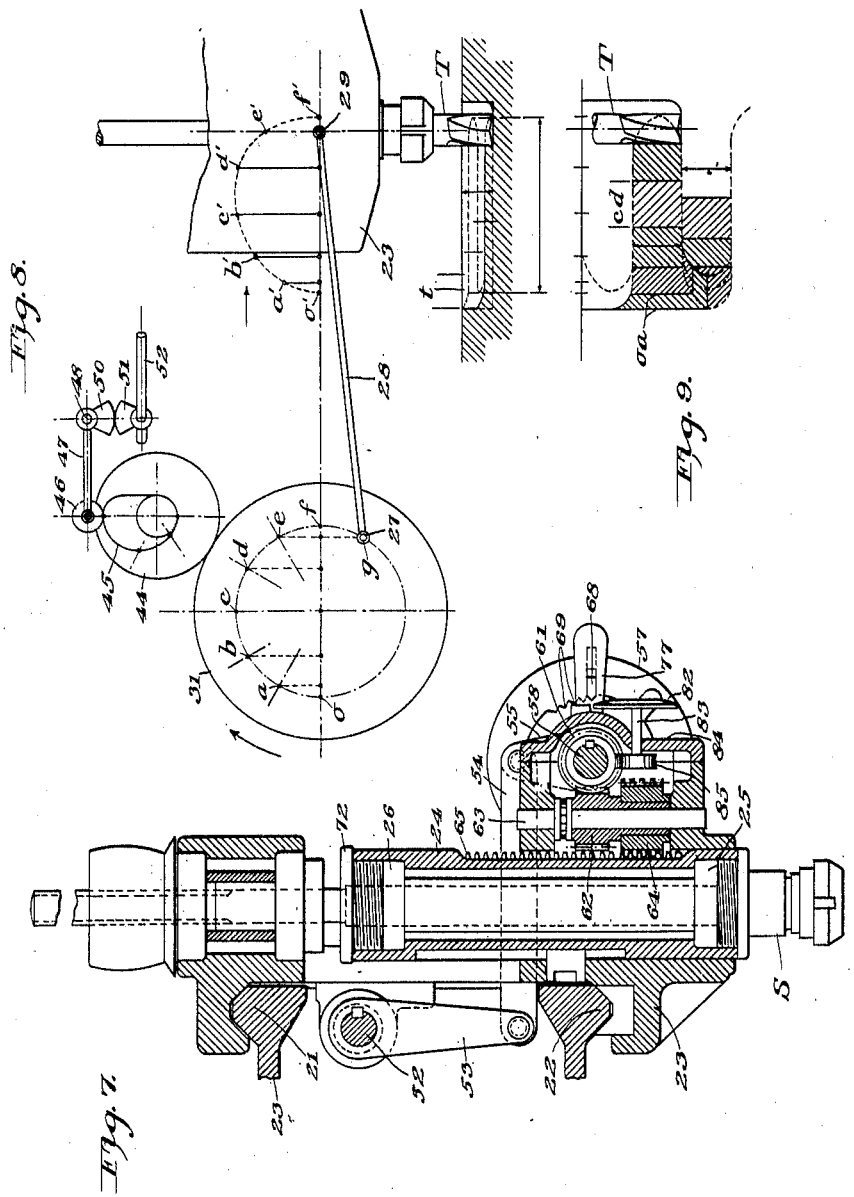

Patented May 22, 1928.

1,670,413

UNITED STATES PATENT OFFICE.

HANS KNEIDL, OF MUNICH, GERMANY.

MILLING MACHINE HAVING CRANK DRIVE AND AUTOMATIC FEED.

Application filed July 25, 1925, Serial No. 46,094, and in Germany October 22, 1924.

This invention relates to milling machines and more particularly to milling machines especially adapted to mill slots, keyways, etc.

The invention has for an object to provide a milling machine in which the relative movements between the tool and the work are such that the strains on the machine and tool will be maintained substantially uniform throughout the entire milling operation.

Another object of the invention is to provide a milling machine in which the work may be held stationary and the relative movement between the work and the tool may be effected by translatory movements of the tool.

Still another object of the invention is to provide a milling machine adapted to cut alternately in vertical and horizontal planes and so to combine and coordinate the relative movements of the work and tool that the transverse cuts will be merged together so as to constitute a continuous operation.

Another object of the invention is so to control the horizontal feed that it will be variable in rate i. e., it will gradually slow down before it reverses its direction of movement and it will start in its reverse direction at a gradually increasing rate, thus precluding the noise, shocks and vibrations of rapidly reversing parts.

Still another object is so to coordinate the vertical and horizontal feeds that the vertical feed will be rendered effective at each reversal of the horizontal feed and at the time when the horizontal feed mechanism is passing through an ineffective or zero point.

These objects have been attained by rotatably and translatably journaling a tool spindle in a carriage slidably mounted on guides provided by the machine standard above the work-support, and providing one mechanism for translating the tool-carriage on its guides and another mechanism for translating the tool spindle axially while the spindle is rotated by means independent of the feeds. The mechanism for translating the tool-carriage comprises a rotating crank and a pitman connecting the crank with the tool-carriage. This crank and pitman produces a variable motion in the tool carriage which eliminates vibration upon reversal of the direction of motion as hereinbefore described.

The axial movement of the tool spindle is effected by a cam actuated in timed relation with the crank, whereby the tool spindle is moved in the direction of its length as the crank is passing through its dead-centers or zero points.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 1 is a side view of a milling machine embodying the present invention. Fig. 2 is a front view thereof. Fig. 3 is an enlarged front view, partly in section of the tool-carriage, its support and its translating mechanism. Fig. 4 is a plan, partly in section, of portions of the tool-carriage and tool-spindle translating mechanisms. Fig. 5 is a section on the line 5—5 of Fig. 4. Fig. 6 is a detail view of a portion of the means for translating the tool spindle and the throw-out device therefor. Fig. 7 is a vertical section on the line 7—7 of Fig. 3. Fig. 8 is a diagrammatic view illustrating the coordination of the vertical and horizontal feed mechanisms. Fig. 9 is a diagrammatic view illustrating the effect of the variable horizontal feed and the intermittent vertical feed.

Referring more particularly to the drawings the invention is disclosed as embodied in a vertical spindle milling machine comprising a standard 1, a knee 2 vertically adjustable on the standard, a saddle 3 horizontally movable on the knee, and a work-supporting table 4 translatably mounted on the saddle and movable in a direction transverse to the direction of movement of the saddle. The knee may be shifted vertically by means of a screw 5 having a threaded connection with the knee and adapted to be rotated manually by any suitable means, such as a crank fitted to the squared end of a shaft 6 journaled in the knee and having a bevel gear connection g with said screw (see Fig. 2). A graduated dial 7 may be adjustably secured to the shaft 6 for the purpose of indicating the vertical adjustment of the knee from any predetermined position, as is common in milling machines. Screw shafts 8 and 9, adapted to receive the usual cranks, serve to shift the saddle and the table, respectively, in a well known manner.

Power to actuate the various mechanisms may be applied to the machine in any suitable manner such for example as by a belt 10, engaging a pulley 11, on a shaft 12 journaled in the standard. To the shaft 12 are secured cone-pulleys 13 and 14 of which the former is connected, by a belt 15, with a similar pulley 16 carried by a shaft 17 journaled in a bracket at the upper end of the standard. The shaft 17 also carries a belt drum 18 which is connected by means of a twisted belt 19, with a pulley 20 splined to a tool spindle S later to be referred to. Thus the tool spindle and the tool T carried thereby are given rotary motion while being translated by means later to be described. The direction of rotation of the spindle may be reversed by reversing the twisted belt 19 and therefore either right or left cutting milling tools may be used.

The standard 1 provides, adjacent its upper end, horizontally disposed guides 21 and 22 to which is slidingly fitted a tool carriage 23 carrying a translatable but non-rotatable sleeve 24. This sleeve provides bearings 25 and 26 for the tool spindle S which is non-translatably journaled therein. By this arrangement the spindle may rotate freely in the sleeve and partake of the reciprocatory movements of the sleeve, as will later be described.

The carriage 23 is translated back and forth on the guides 21 and 22 (to cause the tool T carried, by the spindle, to effect its horizontal cut) by a crank-pin 27 and a pitman 28, which connects the crank-pin with a pivot-bolt 29 secured to the carriage. The crank-pin 27 is adjustably mounted in a crank-arm 30 carried by a gear 31, fixed upon a shaft 32, which latter is journaled in a bracket 33 secured upon the standard 1, and therefore the degree of eccentricity of the crank-pin with respect to the gear 31 determines the extent of lateral movement of the tool-carriage. A scale 30ˣ on the crank-arm serves to indicate the eccentricity of the crank-pin and assists in its adjustment. The shaft 32 is rotated from the shaft 12 by means now to be described. Intermediate the shaft 12 and the shaft 32 the standard supports a shaft 34 which carries a cone pulley 35, connected by a belt 36 with the cone 14. A stepped pulley 37 also is carried by the shaft 34 and a belt 38 connects the pulley 37 with a similar pulley 39 on a shaft 40, also supported by the standard.

Upon the shaft 40 there is secured a worm 41 which meshes with and drives a worm-wheel 42 fixed upon one end of a shaft 43 journaled in the bracket 33. The opposite end of the shaft 43 carries a gear 44 which drives the gear 31 hereinbefore referred to. The ratio of the gears 44 and 31 are as two-to-one and therefore the gear 31 and the crank-arm 30 carried thereby rotate only one-half the speed of the shaft 43.

Lengthwise movement is given to the sleeve 24 and the tool-spindle journaled therein, from the shaft 43, to give to the milling tool its vertical reciprocations. To this end the shaft 43 carries a cam 45 upon which rests a roller 46 carried by an arm 47, fixed to a rock-shaft 48 journaled in a bearing 49 in the standard 1. The rock-shaft also carries a gear-segment 50 which meshes with a similar gear segment 51 secured upon a shaft 52 journaled in the standard transverse to the rock-shaft. Adjacent the sleeve 24 the shaft 52 has secured to it a rock-arm 53 connected, by a link 54, with a lever 55 fulcrumed upon the hub 56 of a hand-wheel 57, which latter is fixed upon a shaft 58 journaled in the tool carriage 23. The lever 55 carries a pawl 59 adapted to engage the teeth of a ratchet wheel 60 also secured upon the shaft 58. The shaft 58 carries a worm 61 (see Fig. 7) which drives a worm-wheel 62, journaled on a vertical shaft 63, supported by the carriage 23. A spiral gear 64 is secured upon the hub of the worm-wheel 62 and meshes with rack-teeth 65 formed in the sleeve 24. From the foregoing it will be perceived that under the action of the cam 45 the shaft 58 intermittently will be partially rotated and that this rotation, through the elements 61, 62, 64 and rack-teeth 65, the sleeve 24 and tool-spindle, will be translated in the carriage 23 which causes the tool to effect a milling cut in a vertical plane.

The cam 45 gives the pawl 59 a constant throw but its effective action on the tool spindle is made variable by means of a disk 66 loosely journaled on the shaft 58 and provided with a high portion 66ˣ adapted to engage a pin 67 projecting from the side of the pawl 59 to lift the pawl out of engagement with the teeth of the ratchet 60 when the pawl is retracted. The position of the portion 66ˣ may be adjusted toward or from the pin, to regulate the number of teeth the pawl may retract over before it is lifted from the ratchet wheel, by adjusting the disk 66 circumferentially about the axis of the shaft 58. The disk having been adjusted to permit the pawl to produce the desired feed it may be secured against accidental movement by means of a normally stationary detent 68 engaging any one of a series of notches 69 formed on the periphery of the disk.

Means also is provided for rendering the vertical feed of the tool ineffective after the tool has entered the work a predetermined distance. This controlling means comprises a push rod 70 slidably mounted in the tool-carriage and adapted to be moved in synchronism with the sleeve 24, as by means of a dog 71 adjustably secured upon the rod and engaging the underside of a flange 72 carried by the sleeve. The lower end of the rod 70 is adapted to contact with a latch lever 73, pivoted at 74 to the carriage, and provided with a projection 75 entering a notch 76 in a lever 77. This lever 77 is journaled upon a hub of the disk 66 and carries the detent 68 which locks the lever and the disk together. A spring 78 connected with the lever 77 tends to swing the lever and the disk 66 about the axis of the shaft anti-clockwise as viewed in Fig. 6 but this movement is normally prevented by the engagement of the projection 75 with the notch 76 under the action of a spring 79 which holds the lever against a stop pin 80. A spring 81 acting on the rod 70 at its upper end serves to lift the rod when the sleeve 24 is elevated.

*Operation.*

Presupposing that it is desired to mill a key-way three inches long and one-half inch deep, the operation of the machine may be as follows: The operator first secures in the tool-spindle a milling cutter of the desired diameter and having side and end teeth. Next he adjusts the crank-pin 27 to give the required translation to the tool-carriage, which translation, plus the diameter of the tool, will equal the desired length of the key-way which in the present instance is to be three inches. Then he shifts the disk 66 so that upon each rotation of the cam 45, and thereby each forward movement of the pawl, the tool will be fed vertically downward a predetermined amount, say one-eighth inch. Now, with the work secured upon the table 4 (which for this purpose is maintained stationary) and the tool spindle lowered until the rod 70 trips the latch-lever 73 out of the notch 76, the operator through the shaft 6 and screw 5 elevates the knee until the tool touches the surface of the work. Next the operator sets the index dial 7 to zero, and elevates the tool spindle to remove the tool from the work. Then by rotation of the shaft 6 from the zero point on the disk 7 he raises the knee, and work supported thereby, a distance equal to the depth of the key-way to be milled i. e., one-half inch. Then, by pulling downwardly on the handle $77^h$, provided by the lever 77, he rotates the lever 77 and the disk 66 clockwise as viewed in Fig. 6 thereby withdrawing the high portion $66^x$ from beneath the pin 67 and permitting the pawl to engage the ratchet wheel 60. The machine is then started and it will continue to operate until the way is completed when it will automatically cease to cut.

Referring now to Figs. 8 and 9, the coordination of the vertical and horizontal feeds of the tool will be more clearly understood. The first feed of the tool is vertically downward under the action of the cam 45. This feed causes the tool to enter the work to the depth determined by the setting of the disk 66 (in this instance one-eighth inch) as illustrated at $t$ in Fig. 8. Now, as the crank 27 passes through the path indicated by the points $o, a, b, c, d, e, f$ the tool carriage is translated through the course $o', a', b', c', d', e'$ and $f'$ and the tool is caused to make its horizontal cut $u$. The vertical and horizontal feeds are so coordinated that the vertical cut is made while the crank is passing through its dead center position and therefore when the horizontal feed is substantially inactive. After having made the vertical cut the vertical feed remains inactive while the horizontal feed is active. As the crank 27 reaches substantially the point $e$ the cam 45 again begins to lift the roller 46 and while the crank is passing from the point $e$, through the point $f$, to the point $g$ the vertical feed again sinks the tool into the work another one-eighth inch and on the next horizontal feed the second horizontal cut is made. This action continues until, when the key-way has been milled to the predetermined depth, the rod 70 trips the latch lever 73 and the spring 78 swings the lever 77 about the shaft 58 carrying with it the disk 66 and causing the portion $66^x$ thereof to lift the pawl 59 out of contact with the ratchet 60, thereby discontinuing the vertical feed. The tool carriage will continue to translate horizontally and the final horizontal cut will be made after which no further vertical feed will be effected and the machine may be stopped. Fig. 9, illustrates, by diagonal shading, the relative amount of metal removed at each 30 degree movement of the crank 27. Thus it will be seen that as the vertical cut is being made only a very slight horizontal movement is effected, as indicated at $oa$, and when the vertical feed is ineffective the horizontal feed is at its maximum as indicated at $cd$. By thus alternating the maximum vertical and horizontal cuts the strains on the machine are maintained substantially constant which materially lessens the wear on the machine and increases its life.

When desired, the automatic vertical feed of the spindle may be rendered ineffective and the spindle may be translated manually by the hand-wheel 57 provided with a hand grasp H. A graduated dial 82 (see Fig. 7) may be utilized to indicate the vertical feed of the spindle when it is shifted manually. This dial 82 is secured upon a shaft 83 journaled in a cap 84, secured to the carriage, and is rotated from the worm 61 by a worm-wheel 85 also secured to the shaft 83.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:—

1. A milling machine combining a standard; guides permanently secured to said standard; a work-support; a tool-carriage translatable on said guides and movable relative to said work-support; a tool carried by said carriage; a first transmission, carried by said standard, to rotate said tool; a second transmission including a crank carried by said standard independent of said carriage; and a pitman connecting said crank with said tool carriage to translate the tool at relatively fast and slow rates.

2. A permanently organized single purpose milling machine combining a standard; a plurality of guides permanently fixed to said standard; a carriage translatably mounted on said guides; a tool-spindle translatably mounted in said carriage; means carried wholly by said standard and including a crank and pitman to reciprocate said tool-carriage; and means to feed said spindle axially as said crank is passing through its dead center positions.

3. A permanently constructed single purpose milling machine combining an upright column terminating at its upper end in an off-set head having formed integrally therewith a plurality of horizontally disposed guides; a tool carriage slidingly fitted upon said guides; a tool spindle rotatably and translatably journaled in said carriage; a pulley splined to said spindle; a driving drum supported by said column; a belt connection between said drum and pulley for rotating said spindle; a normally stationary work-support; a rotating crank and driving means therefor supported by said column; a pitman adjustably connecting said crank with said tool-carriage to reciprocate the latter on said guides; and means actuated by the crank rotating mechanism to effect axial feed of the tool-spindle as the crank is passing through its dead-center positions.

In witness whereof I hereunto subscribe my name.

HANS KNEIDL.